(12) United States Patent
Ikeshima et al.

(10) Patent No.: US 10,459,831 B2
(45) Date of Patent: Oct. 29, 2019

(54) NON-TRANSITORY COMPUTER-READABLE STORAGE MEDIUM, DATA SPECIFICATION METHOD, AND DATA SPECIFICATION DEVICE

(71) Applicant: FUJITSU LIMITED, Kawasaki-shi, Kanagawa (JP)

(72) Inventors: Jun Ikeshima, Kawasaki (JP); Masashi Katou, Nagoya (JP); Keigo Mitsumori, Koube (JP); Yuta Kojima, Nagoya (JP); Eiichi Higuchi, Toyota (JP); Yukihiro Takeuchi, Akashi (JP); Daiki Yoshikawa, Handa (JP); Shotaro Okada, Nishinomiya (JP); Kiyoshi Kouge, Kuwana (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/653,682

(22) Filed: Jul. 19, 2017

(65) Prior Publication Data

US 2018/0032426 A1    Feb. 1, 2018

(30) Foreign Application Priority Data

Jul. 28, 2016  (JP) .................................. 2016-148163

(51) Int. Cl.
*G06F 15/00*    (2006.01)
*G06F 17/00*    (2019.01)
(Continued)

(52) U.S. Cl.
CPC ........ *G06F 11/3684* (2013.01); *H04L 51/066* (2013.01); *H04N 1/00095* (2013.01);
(Continued)

(58) Field of Classification Search
CPC .............. G06F 11/3684; H04L 51/066; H04N 1/00095; H04N 1/00212; H04N 1/32122
(Continued)

(56) References Cited

U.S. PATENT DOCUMENTS

| | | | |
|---|---|---|---|
| 5,634,120 A | 5/1997 | Nagasuka et al. | |
| 6,711,563 B1 * | 3/2004 | Koskas | G06F 16/284 707/769 |

(Continued)

FOREIGN PATENT DOCUMENTS

| | | |
|---|---|---|
| JP | 5-298120 A | 11/1993 |
| JP | 2015-26197 A | 2/2015 |

(Continued)

*Primary Examiner* — Ly D Pham
(74) *Attorney, Agent, or Firm* — Westerman, Hattori, Daniels & Adrian, LLP

(57) ABSTRACT

A data specification method executed by a computer, the method including obtaining a plurality of data groups, specifying a number of types of a plurality of values included in each of the plurality of data groups, obtaining a result of a calculation process using a plurality of values included in a specified data group, specifying a number of types of the plurality of values included in the specified data group, selecting one or more data groups based on the number of types of the plurality of values included in the specified data group and based on the number of types of the plurality of values included in each of the plurality of data groups, and specifying a corresponding data group corresponding to the specified data group from among the selected one or more data groups.

10 Claims, 22 Drawing Sheets

(51) Int. Cl.
  *G06F 11/36*  (2006.01)
  *H04L 12/58*  (2006.01)
  *H04N 1/00*  (2006.01)
  *G06F 9/38*  (2018.01)
  *G06F 9/50*  (2006.01)
  *H04N 1/32*  (2006.01)

(52) U.S. Cl.
  CPC ....... *H04N 1/00212* (2013.01); *G06F 9/3885* (2013.01); *G06F 9/50* (2013.01); *G06F 15/00* (2013.01); *G06F 17/00* (2013.01); *H04N 1/32122* (2013.01)

(58) Field of Classification Search
  USPC .......................................................... 702/127
  See application file for complete search history.

(56) References Cited

U.S. PATENT DOCUMENTS

| | | | | |
|---|---|---|---|---|
| 9,442,980 | B1* | 9/2016 | Trepetin | G06F 21/6254 |
| 9,921,947 | B2* | 3/2018 | Mizobuchi | G06F 11/3684 |
| 9,946,810 | B1* | 4/2018 | Trepetin | H04L 63/0428 |
| 2001/0052062 | A1* | 12/2001 | Lipovski | G11C 7/065 |
| | | | | 712/32 |
| 2007/0121135 | A1* | 5/2007 | Kakutani | H04N 1/4057 |
| | | | | 358/1.9 |
| 2007/0244672 | A1* | 10/2007 | Kjaer | G06F 17/246 |
| | | | | 703/2 |
| 2008/0114770 | A1* | 5/2008 | Chen | G06F 17/30566 |
| 2008/0288445 | A1* | 11/2008 | Ames | G06F 16/2425 |
| 2010/0198864 | A1* | 8/2010 | Ravid | G06F 17/30705 |
| | | | | 707/769 |
| 2014/0244644 | A1* | 8/2014 | Mashinchi | G06F 17/30595 |
| | | | | 707/737 |
| 2015/0033233 | A1 | 1/2015 | Hosokawa et al. | |
| 2015/0278656 | A1 | 10/2015 | Mitsumori et al. | |
| 2016/0117414 | A1* | 4/2016 | Verma | G06F 16/9024 |
| | | | | 707/798 |
| 2016/0379139 | A1* | 12/2016 | Eldar | G06F 17/30598 |
| | | | | 706/12 |

FOREIGN PATENT DOCUMENTS

| | | |
|---|---|---|
| JP | 2015-185027 A | 10/2015 |
| JP | 2012-128770 A | 7/2017 |

* cited by examiner

FIG. 11

| JOB NET NAME 1101 | JOB NAME 1102 | INPUT FILE NAME 1103 | OUTPUT FILE NAME 1104 | EXTRACTION JOB DETERMINATION UNIT 1105 | PROCESSING JOB DETERMINATION FLAG 1106 | AGGREGATION JOB DETERMINATION FLAG 1107 |
|---|---|---|---|---|---|---|
| jobnet001 | job001 | data001 | data002 | on | off | off |
| jobnet001 | job002 | data002 | data003 | off | on | off |
| jobnet001 | job003 | data003 | data004 | off | off | on |
| jobnet002 | job101 | data101 | data102 | on | off | off |
| jobnet002 | job102 | data102 | data103 | off | on | off |
| jobnet002 | job103 | data103 | data104 | off | off | on |

FIG. 12

| | 1201 | 1202 | 1203 | 1204 | 1205 |
|---|---|---|---|---|---|
| | NAME | AFFILIATION | AGE | SALARY | WORK PLACE |
| | AA | FIRST DEVELOPMENT DEPARTMENT | 20 | 20 | TOKYO |
| | BB | FIRST DEVELOPMENT DEPARTMENT | 25 | 23 | TOKYO |
| | CC | SECOND DEVELOPMENT DEPARTMENT | 30 | 26 | AICHI |
| | DD | SECOND DEVELOPMENT DEPARTMENT | 35 | 29 | OSAKA |
| | EE | SECOND DEVELOPMENT DEPARTMENT | 30 | 32 | OSAKA |
| | FF | THIRD DEVELOPMENT DEPARTMENT | 45 | 35 | AICHI |
| | GG | THIRD DEVELOPMENT DEPARTMENT | 50 | 38 | TOKYO |

FIG. 13

| DEPARTMENT | AVERAGE SALARY |
|---|---|
| FIRST DEVELOPMENT DEPARTMENT | 20 |
| SECOND DEVELOPMENT DEPARTMENT | 25 |
| THIRD DEVELOPMENT DEPARTMENT | 30 |

FIG. 14

| ROW NUMBER (1401) | ITEM NAME (1402) | TYPE NUMBER (1403) |
|---|---|---|
| 1 | NAME | 7 |
| 2 | AFFILIATION | 3 |
| 3 | AGE | 7 |
| 4 | SALARY | 7 |
| 5 | WORK PLACE | 3 |

FIG. 15

| JOB NET NAME ⌐1501 | JOB NAME ⌐1502 | EXTRACTION DATA NAME ⌐1503 | DIVISION REFERENCE ROW INFORMATION ⌐1504 |
|---|---|---|---|
| jobnet001 | job001 | data001 | 3 |
| jobnet002 | job101 | data101 | -1 |

FIG. 17

| JOB NAME (1701) | INPUT SEEK PROCESS FLAG (1702) | OUTPUT SEEK PROCESS FLAG (1703) |
|---|---|---|
| job003 | off | off |
| job103 | on | off |

FIG. 20

| JOB NAME ⌐2001 | OUTPUT DATA SIZE ⌐2002 | PROCESSABLE DATA SIZE ⌐2003 | END TIME ⌐2004 | PARALLEL EXECUTION FLAG ⌐2005 |
|---|---|---|---|---|
| job001 | XXX | 40 | 10:55 | on |
| job101 | YYY | 35 | 13:25 | off |

NON-TRANSITORY COMPUTER-READABLE STORAGE MEDIUM, DATA SPECIFICATION METHOD, AND DATA SPECIFICATION DEVICE

CROSS-REFERENCE TO RELATED APPLICATION

This application is based upon and claims the benefit of priority of the prior Japanese Patent Application No. 2016-148163, filed on Jul. 28, 2016, the entire contents of which are incorporated herein by reference.

FIELD

The embodiment discussed herein is related to a non-transitory computer-readable storage medium, a data specification method, and a data specification device.

BACKGROUND

In an information process system, an information process device performs a process to data stored in a storage device and outputs a process result or performs a process of storing in the storage device.

As an example, as in Case 1 illustrated in FIG. 1, the information process device executes a process (extraction process) for extracting data from the storage device, a process (processing process) for processing the extracted data, and a process (aggregation process) for calculating the processed data, for example, aggregating the processed data. An aggregation result of the extracted data is generated as a process result by executing the extraction process, the processing process, and the aggregation process in sequence. The aggregation result is, for example, data indicating a representative value such as an average value or a median value of a data value. In the following, as described above, each of the processes of the information process device is referred to as a "job".

After the job generates a process result and ends execution, execution of another job may be started using the generated process result. In addition, in a case where a plurality of jobs is executed in sequence, timing of an execution start of each of the jobs is managed so that the plurality of jobs are ended within a predetermined period of time by a job scheduler, or the like.

If a process of the job is delayed, the plurality of jobs may not be ended within the predetermined period of time. Therefore, in a case where a delay in the job processes occurs, it is preferable to solve the occurred delay.

As the related art, for example, as in Case 2 illustrated in FIG. 1, the job (processing job) for executing the processing process described above is distributed to a plurality of information processes and the processes are executed in parallel (parallel execution), thereby achieving the processes at a high speed.

Japanese Laid-open Patent Publication No. 2015-185027 is an example of the related art.

SUMMARY

According to an aspect of the invention, a non-transitory computer-readable storage medium storing a data specification program which causes a computer to execute a process, the process including obtaining a plurality of data groups, each of the plurality of data groups including a plurality of values corresponding to each of the plurality of data items, specifying a number of types of the plurality of values included in each of the plurality of data groups, obtaining a result of a calculation process using a plurality of values included in a specified data group among the plurality of data groups, specifying a number of types of the plurality of values included in the specified data group, selecting one or more data groups from among the plurality of data groups based on the number of types of the plurality of values included in the specified data group and based on the number of types of the plurality of values included in each of the plurality of data groups, and specifying a corresponding data group corresponding to the specified data group from among the selected one or more data groups based on a correlation between a value included in the selected one or more data group and a value included in the specified data group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates an example of information stored in a job definition information storage unit;

FIG. 12 illustrates an example of extraction data;

FIG. 13 illustrates an example of aggregation data;

FIG. 14 illustrates an example of information stored in a type number information storage unit;

FIG. 15 illustrates an example of information stored in an extraction data information storage unit;

FIG. 17 illustrates an example of information stored in a seek process management information storage unit;

FIG. 20 illustrates an example of information stored in an operation information storage unit;

DESCRIPTION OF EMBODIMENT

According to an execution status of jobs, there is a case where execution of the jobs may be desired to further speed up.

Figure 1:
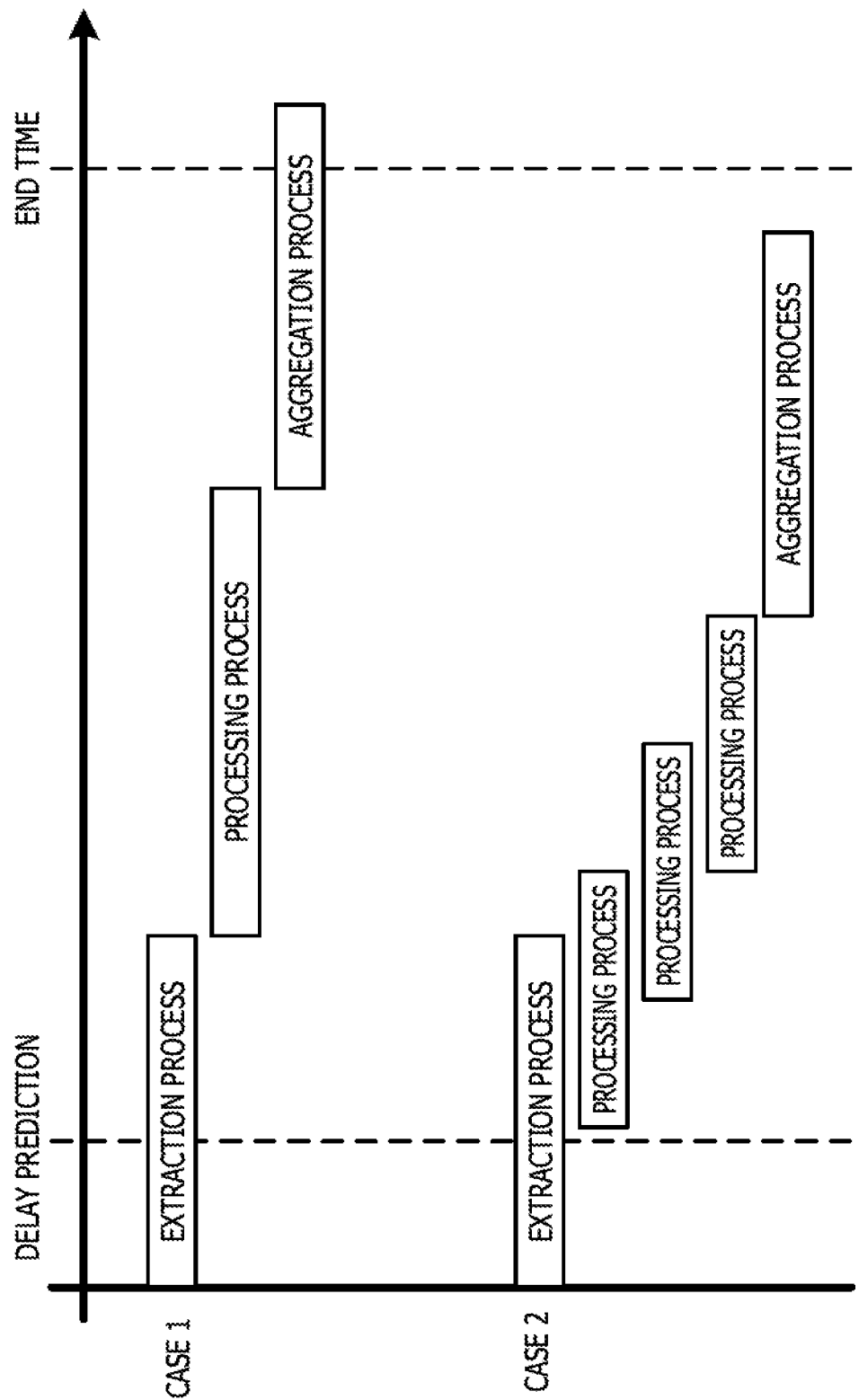
FIG. 1 illustrates an example of an extraction process, a processing process, and an aggregation process.
Figure 2:
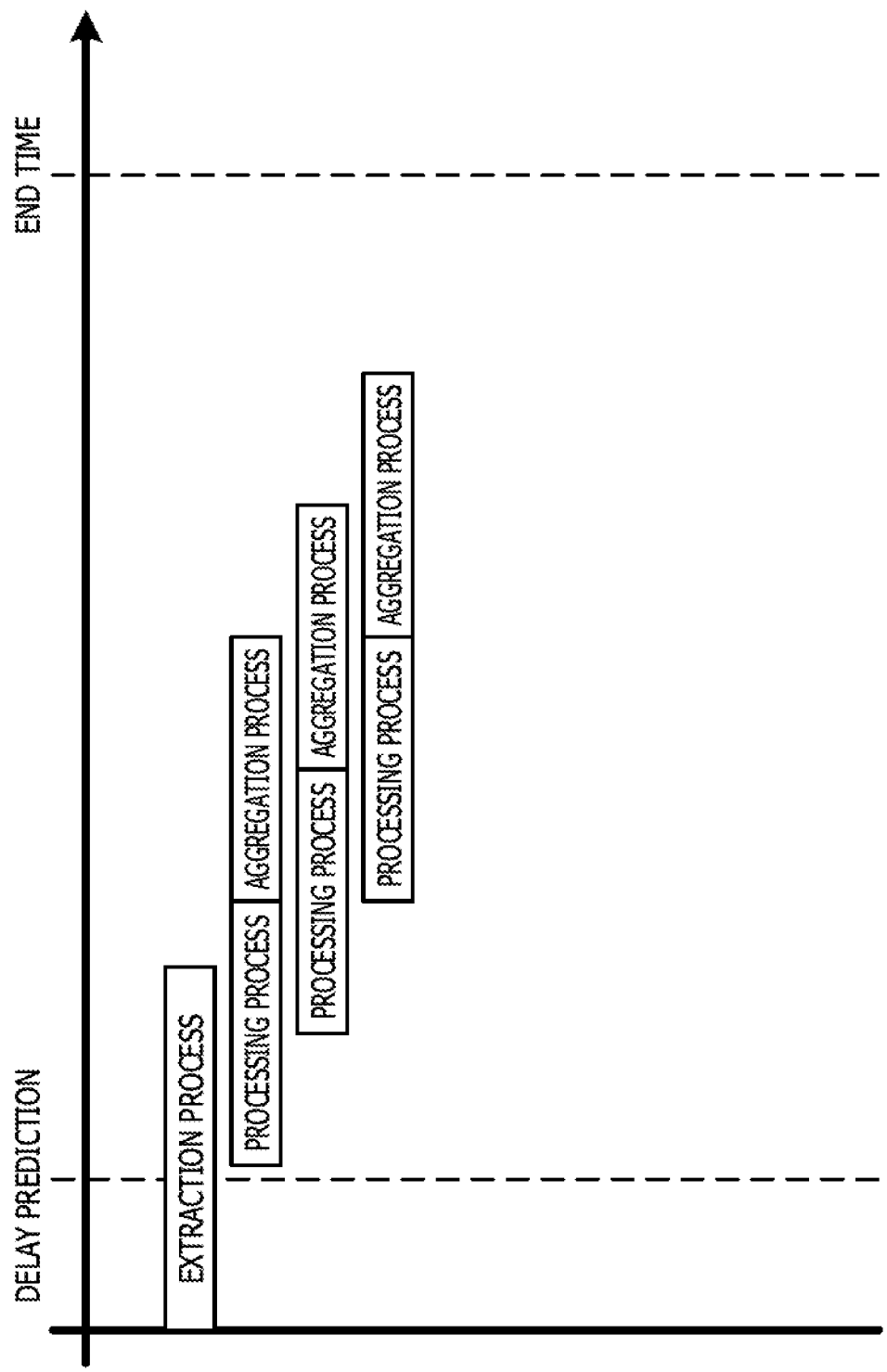
FIG. 2 illustrates an example of parallel execution of an aggregation job.

For example, as illustrated in FIG. 2, it is considered that execution of the jobs may further speed up by executing not only a processing job described above but also a job (aggregation job) which performs an aggregation process succeeding the processing job in parallel.

However, in a case of the aggregation process, if the process is simply executed in parallel, it is apprehended that an error occurs in a result of the aggregation process.

Figure 3:
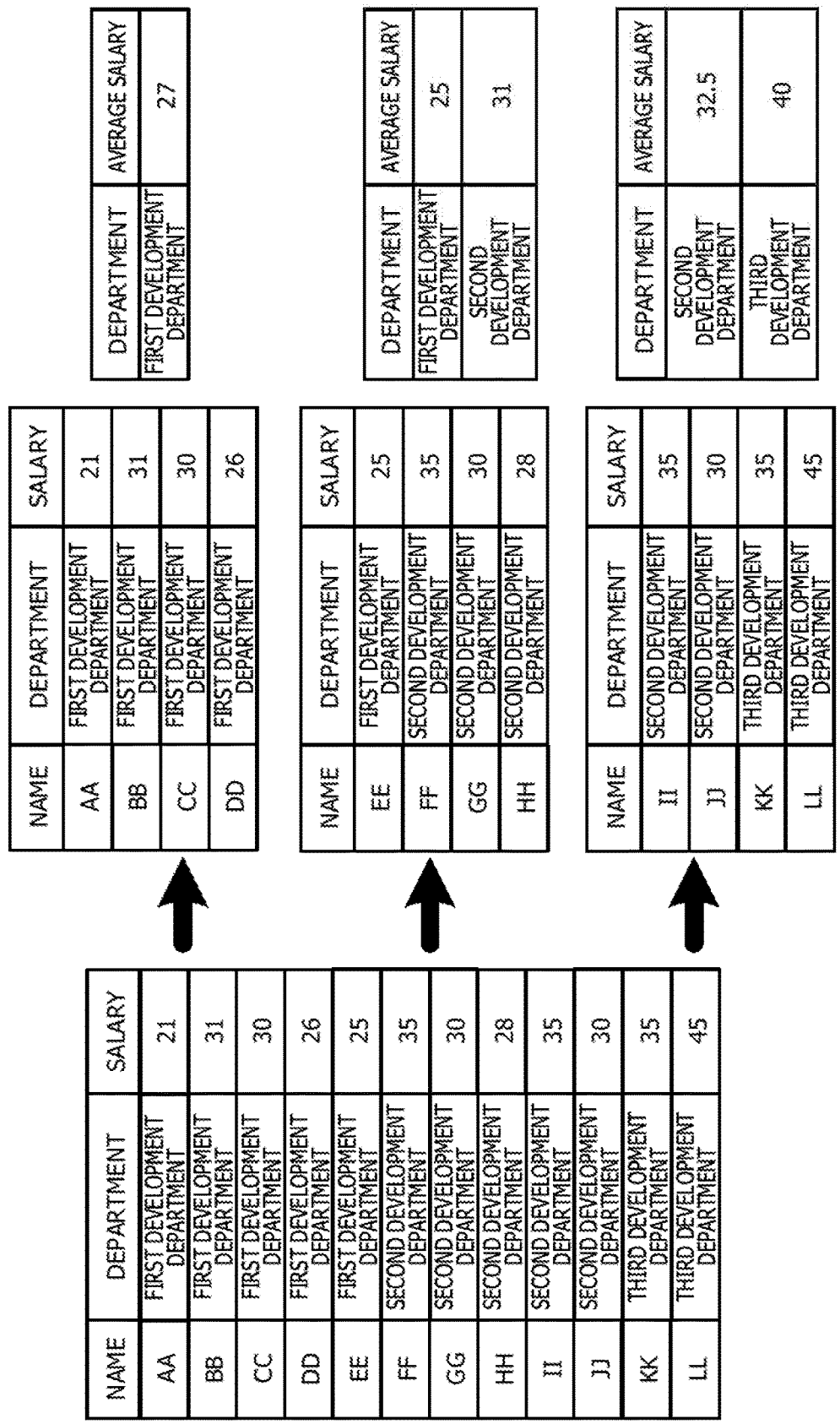
FIG. 3 illustrates an example in which an error occurs in a result of the aggregation process.

An example is illustrated in FIG. 3. In the example in FIG. 3, it is assumed an average salary of employees is obtained for each of departments by the aggregation job. Then, in the example in FIG. 3, the aggregation job is distributed to three jobs and executed. Input data is divided so that the number of pieces of the input data is equal for each of jobs. However, results of the aggregation process are respectively generated in a plurality of distributed parallel processes. For this reason, as illustrated in aggregation results of "first development department" or "second development department" in FIG. 3, a plurality of aggregation of which values of results are different from each other are generated and a correct value may not be obtained.

For example, according to the example in FIG. 3, in order to reduce an error of the aggregation result, it is preferable to divide output data from extraction job so that the input data is divided for each of departments. To do so, in a step of an extraction process of executing the extraction job, it is preferable to specify a data row in extraction data by which classification can be distinguished in the aggregation process.

In a case where the extraction data is extracted from a record of a database (DB), the record generally includes a plurality of data rows (data items). For this reason, it is preferable to specify a data row in extraction data, by which classification can be distinguished in the aggregation process, from the plurality of data rows included in the record.

In one aspect, it is an object to specify a data group corresponding to a data group used for a calculation process from a plurality of data groups.

Examples of the present embodiment will be described with reference to drawings.

Overall Configuration

Figure 4:
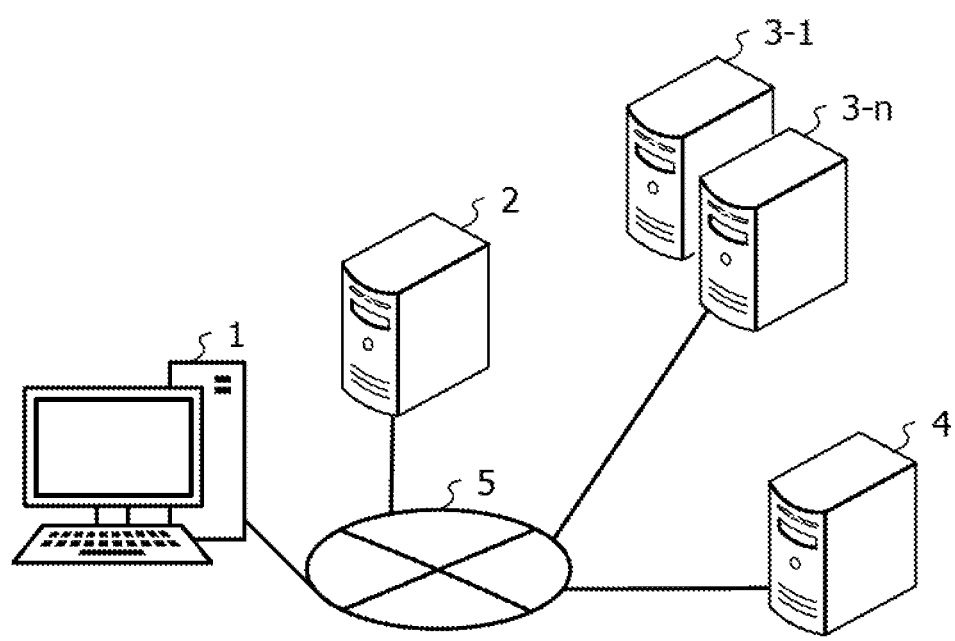
FIG. 4 illustrates a configuration of an information process system which is an example of an embodiment.

FIG. 4 illustrates a configuration of an information process system which is an example of the embodiment. In the example of the embodiment, for example, a terminal device 1, a management device 2, execution servers 3-1 to 3-$n$, and a DB server 4 are communicably connected to each other via a network 5.

The terminal device 1 is, for example, a computer used for performing an execution request of a job by an administrator or viewing an execution result of the job. As the terminal device 1, for example, a computer such as a personal computer (PC), a smartphone, a personal digital assistant (PDA), or the like can be used.

The management device 2 is a computer for controlling jobs executed by the execution servers 3-1 to 3-$n$.

The execution servers 3-1 to 3-$n$ execute various jobs or each of processes included in the job under control of the management device 2 according to the execution request of the job.

The DB server 4 activates a database in which data used for execution of jobs is stored and executes control of the database. In addition, in the present example, data is extracted from a record, stored in the database controlled by the DB server 4, by an extraction job.

Each of the management device 2, the execution servers 3-1 to 3-$n$, and the DB server 4 is a computer such as a server device.

Although FIG. 4 illustrates one terminal device 1, one management device 2, and one DB server 4 and illustrates a plurality of execution servers 3-1 to 3-$n$ as an execution server, the number of devices as a hardware may be arbitrary.

Terminal Device

Figure 5:
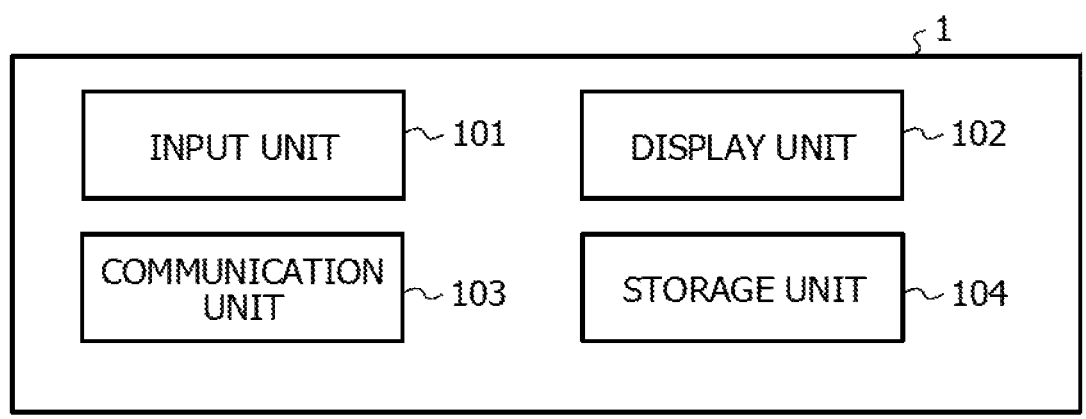
FIG. 5 illustrates a functional block diagram of a terminal device.

FIG. 5 illustrates a functional block diagram of the terminal device 1. The terminal device 1 includes an input unit 101, a display unit 102, a communication unit 103, and a storage unit 104.

The input unit 101 receives an operation input from a user. As the input unit 101, a hardware such as a keyboard, a mouse, or the like can be used.

The display unit 102 is, for example, liquid crystal display and can display data stored in a database controlled by an execution result of jobs or the DB server 4. As the display unit 102, a projection device such as a projector may be used.

The communication unit 103 can perform communication with the management device 2, the execution servers 3-1 to 3-$n$, the DB server 4, and other information process devices by wire or by wireless. The communication unit 103 is a communication device such as network adapter, a network interface controller (NIC), or the like included in the terminal device 1.

The storage unit 104 is realized using a storage medium such as a memory, hard disk drive (HOD), solid state drive (SSD), or the like included in the terminal device 1. The storage unit 104 can store various types of data obtained by a database or the like.

Execution Server

Figure 6:
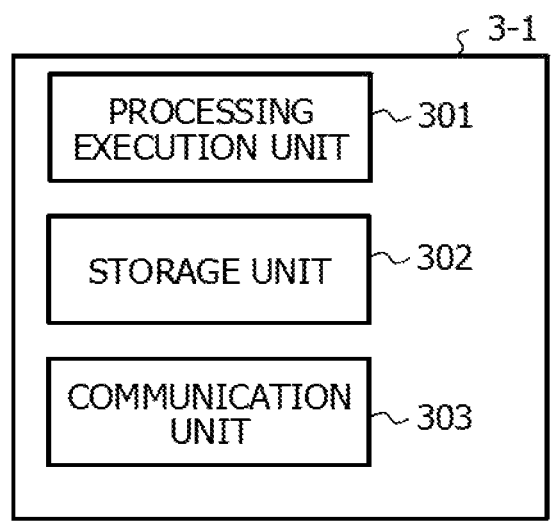
FIG. 6 illustrates a functional block diagram of execution servers.

FIG. 6 illustrates a functional block diagram of the execution servers 3-1 to 3-$n$. FIG. 6 illustrates the execution servers 3-1 among the execution servers 3-1 to 3-$n$, but each of the execution servers 3-1 to 3-$n$ may be illustrated in the same manner as FIG. 6. The execution servers 3-1 to 3-$n$ include a process execution unit 301, a storage unit 302, and a communication unit 303.

The process execution unit 301 executes jobs based on control of the management device 2. The process execution unit 301 is realized, for example, by a processor included in the server device, which is an execution server, executing a program. Here, the processor is a generic term of a hardware circuit such as central processing unit (CPU), micro processing unit (MPU), application specific integrated circuit (ASIC), or the like. The program may be stored in the storage unit 302 and read during process execution or may be received from another information process device or storage device such as the management device 2.

The storage unit 302 is a storage medium such as a memory, HDD, SSD, and the like included in the server device, which is an execution server, as a hardware. The storage unit 302 can store various types of data obtained and generated by the execution server executing jobs. In addition, as described above, the storage unit 302 can store a program desired for executing the jobs.

The communication unit 303 can execute transmission and reception of the data to and from the terminal device 1, the management device 2, the DB server 4, and other information process devices. The communication unit 303 is a communication device such as network adapter, NIC, or the like included in the server device which is an execution server.

DB Server

Figure 7:
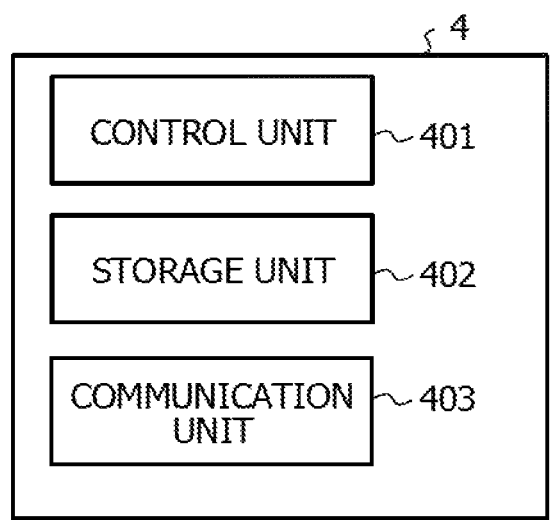
FIG. 7 illustrates a functional block diagram of a DB server.

FIG. 7 illustrates a functional block diagram of the DB server 4. The DB server 4 includes a control unit 401, a storage unit 402, and a communication unit 403.

The control unit 401 executes control of a database realized using a storage area of the storage unit 402. The control unit 401 is realized, for example, by a processor included in the server device, which is a DB server, executing a program. The program may be stored in a memory, a storage device, or the like device included in the server device, which is a DB server, and may be read during process execution or may be received from another information process device or storage device.

The storage unit 402 includes the storage area for realizing the database. The storage unit 402 is a storage medium such as a memory, HDD, SSD, and the like included in the server device, which is a DB server, as a hardware. In addition, the storage unit 402 can store a program for causing the DB server 4 to function as a database management system (DBMS). The storage unit 402 is not a storage medium embedded in the server device may be another storage device connected with the server device.

The communication unit 403 can execute transmission and reception of data to and from the terminal device 1, the management device 2, the execution servers 3-1 to 3-n, and other information process devices. The communication unit 403 is a communication device such as network adapter, NIC, or the like included in the server device which is a DB server.

Management Device

Figure 8:
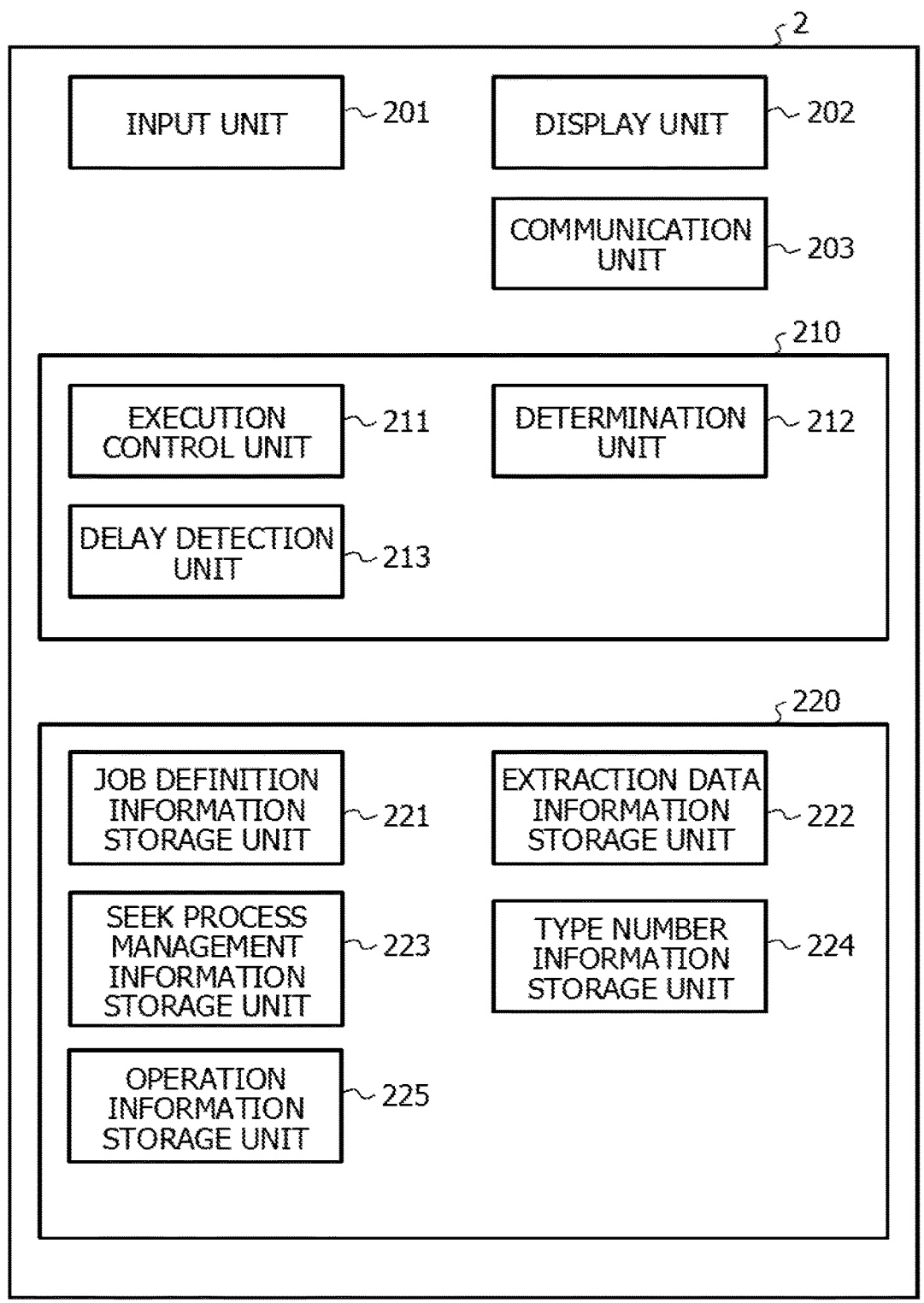
FIG. 8 illustrates a functional block diagram of a management device.

FIG. 8 illustrates a functional block diagram of the management device 2. The management device 2 includes an input unit 201, a display unit 202, a communication unit 203, a control unit 210 and a storage unit 220.

The input, unit 201 receives an operation input from a user. The display unit 202 is, for example, liquid crystal display and can display data stored in a database controlled by an execution result of jobs or the DB server 4. As the display unit 202, a projection device such as a projector may be used. Although the input unit 201 and the display unit 202 can be used instead of the input unit 101 and the display unit 102 included in the terminal device 1, in a case where the management device 2 is communicably connected with the terminal device 1, the input unit 201 and the display unit 202 can be omitted.

The communication unit 203 can perform communication with the terminal device 1, the execution servers 3-1 to 3-n, the DB server 4, and other information process devices. The communication unit 203 is a communication device such as network adapter, network interface controller (NIC), or the like included in the terminal device 1. For example, transmission and reception of various types of data described in the present example are executed using the communication unit 203.

The control unit 210 includes an execution control unit 211, a determination unit 212, and a delay detection unit 213. The control unit 210 is realized, for example, by a processor included in the server device, which is a management device, executing a program. Here, the processor is a generic term of a hardware circuit such as CPU, MPU, ASIC, or the like. The program may be stored, for example, in the storage unit 220 and read during process execution or may be received from another information process device or storage device.

The execution control unit 211 controls jobs executed by the execution servers 3-1 to 3-n.

The determination unit 212 executes a determination process of determining whether or not parallel execution is possible or a specification process of a data row described below data extracted by a job (extraction job) for executing the extraction process.

The delay detection unit 213 detects or predicts a delay of a job process during job execution.

The storage unit 220 includes a job definition information storage unit 221, an extraction data information storage unit 222, a seek process management information storage unit 223, a type number information storage unit 224, and an operation information storage unit 225. Each of storage units included in the storage unit 220 will be described below in detail. In addition, the storage unit 220 can store a program for management device 2 performing various processes of the present example described below.

The storage unit 220 is a storage medium such as a memory, HDD, SSD, and the like included in the server device, which is a management device, as a hardware. For example, in a case where the management device 2 is communicably connected with the DB server 4, each of the storage units included in the storage unit 220 described above may be included in the storage unit 402 included in the DB server 4.

Test Operation

Various processes executed in the present example will be described. In the following description, a case where a job is executed as actually operating of an information process system is described as actual operation and a case where a trial job is executed prior to the actual operation is described as test operation.

First, the test operation will be described.

Figure 9:
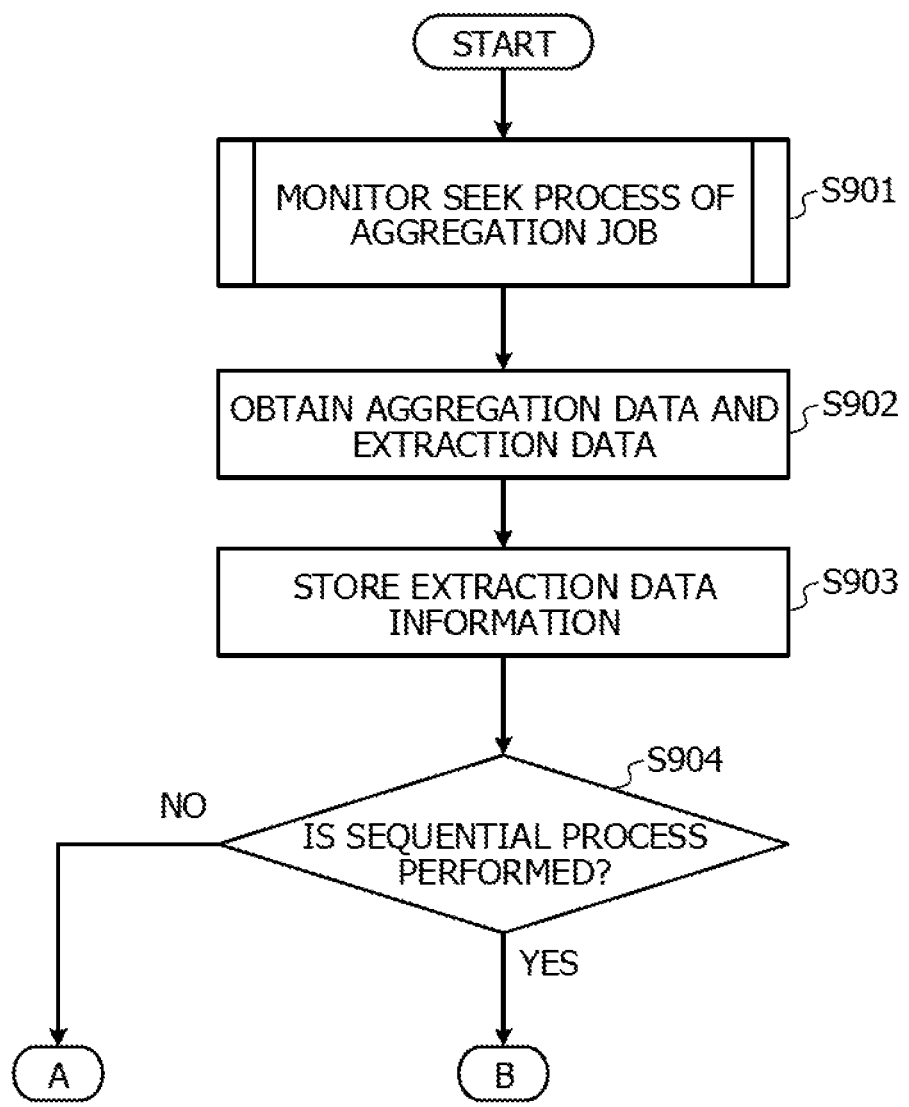
FIG. 9 illustrates a flowchart (first half part) of processes executed by the management device during test operation.
Figure 10:
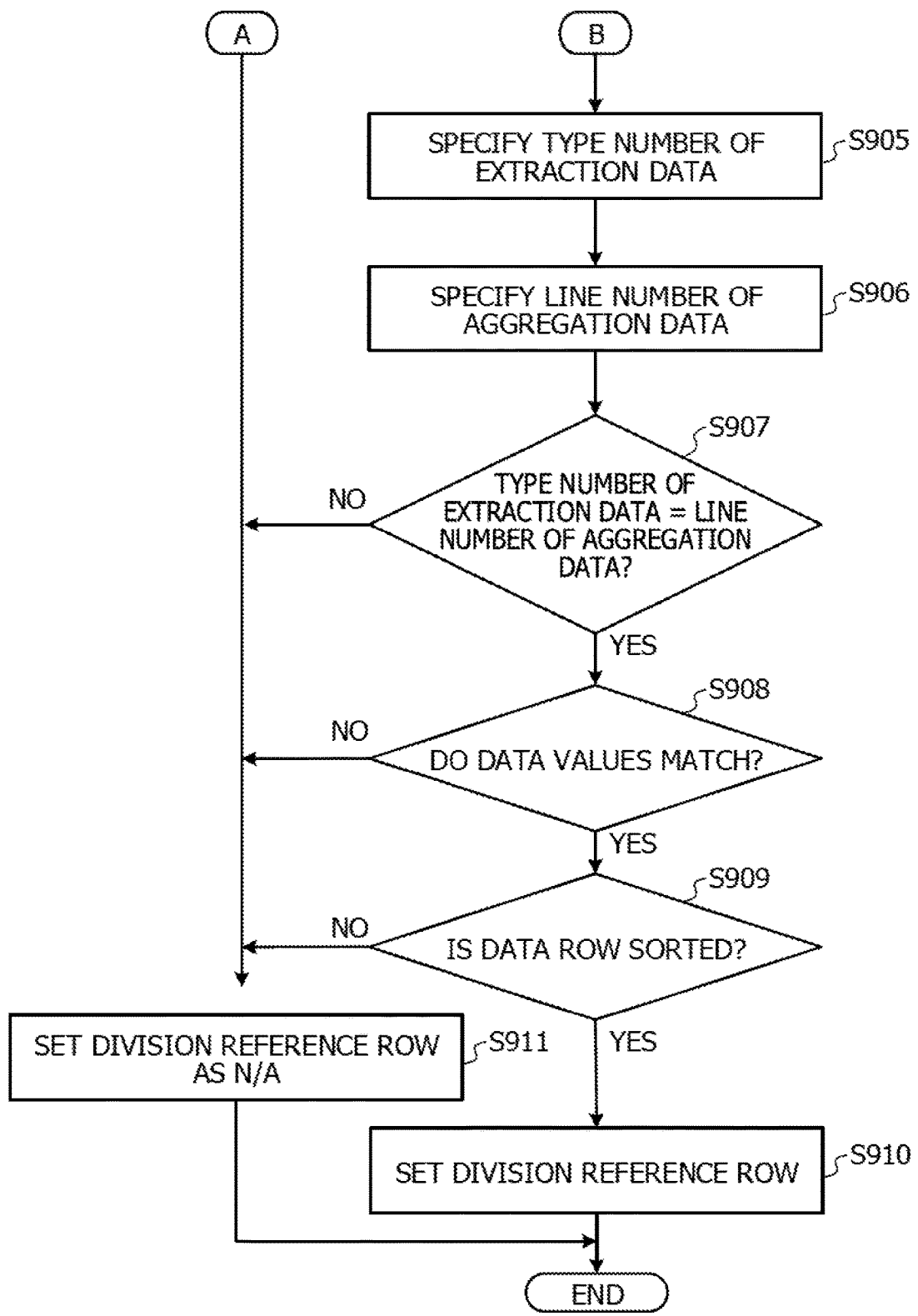
FIG. 10 illustrates a flowchart (latter half part) of the processes executed by the management device during the test operation.

FIGS. 9 and 10 are flowcharts of processes executed by the management device 2 during the test operation. A series of processes illustrated in FIGS. 9 and 10 is started, for example, according to an execution request of jobs transmitted from the terminal device 1 during the test operation. Execution of each of the jobs is assigned to one of the execution servers 3-1 to 3-n under control of the execution control unit 211 of the management device 2.

Here, information related to execution control of the jobs will be described.

FIG. 11 illustrates an example of information stored in the job definition information storage unit 221. For example, as illustrated in FIG. 11, the job definition information storage unit 221 stores a job net name 1101, a job name 1102, an input file name 1103, an output file name 1104, an extraction job determination flag 1105, a processing job determination flag 1106, and an aggregation job determination flag 1107. The job net name 1101 is information capable of identify a job net to which each of jobs belongs. A job net is a group of jobs equal to or more than one designating execution order. In FIG. 11, "jobnet001" and "jobnet002" are described as a job net name, but a specific data format of the job net name 1101 is not limited to one form and may be different from that of FIG. 11 as long as each of job nets can be uniquely identified.

The job name 1102 is information capable of identifying each of a plurality of jobs of an execution target. In FIG. 11, "job001", "job002", and "job003" or "job101", "job102", and "job103" are described as a job name, but a specific data format of the job name 1102 is not limited to one form and may be different from that of FIG. 11 as long as each of jobs can be uniquely identified.

The input file name 1103 is information capable of identifying data input during execution of each of jobs. In addition, the output file name 1104 is information capable of identifying data generated or output which is a result of execution of each of the jobs. In FIG. 11, "data001" to "data004" or "data101" to "data104" are described as an input file name or an output file name, but a specific data format of a data name is not limited to one form and may be different from that of FIG. 11 as long as each pieces of data can be uniquely identified.

The extraction job determination flag 1105, the processing job determination flag 1106, and the aggregation job determination flag 1107 are information capable of specifying a type of each of the jobs. In a case where a job is the extraction job, a value of the extraction job determination flag 1105 is "on", In the same manner, when a job is the processing job, a value of the processing job determination flag 1106 is "on" and when a job is the aggregation job, a value of the aggregation job determination flag 1107 is "on". In a case where a job is the processing job and the processing job can be performed in parallel with the preceding extraction job, a value of the processing job determination flag 1106 is "on". In addition, in a case where a job is the aggregation job and the aggregation job can be performed in parallel with the preceding processing job, a value of the aggregation job determination flag 1107 is "on". In FIG. 11, a type of each of the jobs can be specified using three pieces of flag information, but a method of holding data can be appropriately changed as long as the type of each of the jobs can be specified.

As described in FIG. 11, when a job net name is "jobnet001", job names are respectively three "job001", "job002", and "job003". In the following description, a job of which a job name is "job001" is referred to as a "job of job001".

A job of job002 is the processing job and output data of the job of job001, which is the extraction job, is taken as input data. In addition, a job of job003 is the aggregation job and output data of the job of job002, which is the processing job, is taken as input data. For this reason, it is desirable that three jobs are executed in order of "job001", "job002", and "job003".

The execution control unit 211 executes scheduling for execution order of each of jobs or timing of an execution start based on an input and output relationship of data described above. In the present example, information for specifying timing of the execution start is stored in the operation information storage unit 225, which will be described below in detail.

Returning to the description in FIG. 9. In execution of a job, the determination unit 212 of the management device 2 monitors a seek process of the job executing the aggregation process (step S901). A process of step S901 will be described below in detail.

For example, the determination unit 212 obtains data (hereinafter, referred to as "extraction data") extracted by the extraction job and data (hereinafter, referred to as "aggregation data") of an aggregation result generated by the aggregation job after an execution end of each of jobs during the test operation (step S902). In execution of jobs during the test operation, it is assumed that parallel execution of each of the jobs is not executed.

The determination unit 212 stores information related to contents of the extraction data in the extraction data information storage unit 222 based on the obtained extraction data (step S903).

Here, an example of the extraction data and the aggregation data described above will be described.

FIG. 12 illustrates an example of extraction data. For example, extraction data 1200 illustrated in FIG. 12 is a record including a name 1201, an affiliation 1202, an age 1203, a salary 1204, and a work place 1205 as a data row. Details on a meaning of data of each of data rows are omitted, but the extraction data is, for example, personnel information of a company. FIG. 12 illustrates the example of the extraction data and a data row included in the extraction data may be different from that in FIG. 12, and may further include more data rows. For example, in a case of a relational database (RDB), in the record in FIG. 12, each of the name 1201, the affiliation 1202, the age 1203, the salary 1204, and the work place 1205 is a label name (data item name) of a data row. A group of values corresponding to data items included in each of a plurality of records can be regarded as a data group including a plurality of values corresponding to the data items.

FIG. 13 illustrates an example of aggregation data. The aggregation data 1300 illustrated in FIG. 13 includes a department 1301 and an average salary 1302 as a data row (data item). That is, the aggregation data 1300 is a result of calculation of an average salary for each of departments according to execution of the aggregation job. FIG. 13 illustrates the example of the aggregation data and in a case where the executed aggregation job is different, that is, the aggregation process defined for the aggregation job is different, a form of the aggregation data may be different.

Returning to the description in FIG. 9 again. In step S904, the determination unit 212 determines whether or not input and output of data with, respect to the aggregation job are executed by a sequential process based on a monitoring result of the seek process executed in step S901. This is because parallel execution may not be applied in a case where at least one of data input to the aggregation job and data output from the aggregation job is not the sequential process. For example, in a case where data of an input and output target is a record, the sequential process is a process in which the data is referenced in an arrangement order of the record during data input. Alternatively, the sequential process is a process in which an output order of the record, which is output data, matches with the arrangement order of the record in a database during data output.

In a case where at least one of data input to the aggregation job and data output from the aggregation job is not the sequential process, the process is moved to the process in step S911 illustrated in FIG. 10 (moved from a terminal A in FIG. 9 to a terminal A in FIG. 10 in the diagram of the flowchart). On the other hand, in a case where both of data input to the aggregation job and data output from the aggregation job are the sequential processes, the process is moved to the process in step S905 illustrated in FIG. 10 (moved from a terminal B in FIG. 9 to a terminal B in FIG. 10 in the diagram of the flowchart).

In step S905, the determination unit 212 specifies type numbers of values of each of data rows included in each of pieces of the extraction data. Here, the type number of the values of each of the data rows is the number of pieces of data in a case where overlapping data values are collectively counted as 1 for each of the data rows.

An example will be described based on the extraction data 1200 illustrated in FIG. 12. For example, in data rows of the name 1201, the number of records is 7, and data values are "AA", "BB", "CC", "DD", "EE", "FF", and "GG" and are different from each other. Therefore, in the data rows of the name 1201, a type number of data is 7. On the other hand, in data rows of the affiliation 1202, the number of records is 7 in the same manner as the data rows of the name 1201. In details of data values, "first development department" is 2, "second development department" is 3, and "third development department" is 2, that is, data value is one of three "first development department", "second development department", and "third development department". Therefore, in the data rows of the affiliation 1202, a type number of data is 3.

FIG. 14 illustrates an example of information stored in the type number information storage unit 224. Information illustrated in FIG. 14 is information indicating a type number of a data value of each of the data rows included in the extraction data 1200 illustrated in FIG. 12. In a case where a plurality pieces of extraction data are obtained, the information illustrated in FIG. 14 is generated and stored in the type number information storage unit 224 for each pieces of the obtained extraction data.

The type number information storage unit 224 stores, for example, a row number 1401, an item name 1402, a type number 1403.

In the row number 1401, a position of a data row in the extraction data is indicated by a serial number when a left side is a head (row number=1) in FIG. 12. However, a specific form of data is not limited to the form illustrated in FIG. 14 as long as a position of each of data rows can be specified. For example, a data value may be 0 which is a value of the row number by a serial number when the left side is the head in FIG. 12.

The item name 1402 is information indicating a name (label name) of data row of the extraction data. The item name 1402 can be used as information for uniquely identifying each of the data rows in the extraction data. However, each of the data rows can be identified with reference to any one of the row number 1401 and the item name 1402 as long as each of the row number 1401 and the item name 1402 can uniquely identify each of the data rows. Therefore, both of the row number 1401 and the item name 1402 are not desired as long as each of the row number 1401 and the item name 1402 can uniquely identify each of the data rows.

The type number 1403 is information indicating a type number of data for each of the data rows. The type number of data is as described above.

For example, as described in the description of the extraction data 1200 according to the information illustrated in FIG. 14, for the data rows of the name 1201, a type number of data is 7 and in the extraction data, the data row positioned at a first from a left (in a case of FIG. 12) is specified.

Returning to the description of the flowchart in FIG. 10 again. After execution of the process in step S905, the determination unit 212 specifies an output line number of the aggregation data (step S906). For example, in the aggregation data 1300 illustrated in FIG. 13, the output line number is information indicating a line number in a longitudinal direction. However, at this time, a line which is an item name of a data row (upper most line in FIG. 13) is not counted as a line number. Therefore, for example, in the aggregation data 1300 illustrated in FIG. 13, an output line number is 3. The output line number of the aggregation data can also be said to be a type number of values of data items used for classification in the aggregation data.

The determination unit 212 compares a type number of values for each of the data rows of the extraction data stored in the type number information storage unit 224 in step S905 with an output line number of the aggregation data specified in step S906. Then, the determination unit 212 determines whether or not there is a data row, of which the type number of the values matches with the output line number of the aggregation data, in the extraction data (step S907).

For example, explaining the extraction data 1200 illustrated in FIG. 12 and the aggregation data 1300 illustrated in FIG. 13, an output line number of the aggregation data is 3. Therefore, a type number of values, that is, data rows of the affiliation 1202 and the work place 1205, which are data rows of which the type number 1403 illustrated in FIG. 14 is 3, are specified. In a case where the determination unit 212 determines that there is no data row, of which the type number of the values matches the output line number of the aggregation data, in the extraction data (No in step S907), the process is moved to the process in step S911. As an example in the present example, it is determined whether or not there is a data row, of which the type number of the values matches with the output line number of the aggregation data, in the extraction data, but for example, the determination may be such that a difference in the type number is equal to or smaller than a predetermined value without being limited to complete matching.

In the process in step S907, in a case where it is determined that a data row, of which the type number of the values matches with the output line number of the aggregation data, exists one or more in the extraction data (Yes in step S907), the determination unit 212 executes the process in step S908. In step S908, the determination unit 212 compares a value of the data row with a value of the aggregation data for each of the data rows, of which the type number of the values matches with the output line number of the aggregation data, and determines whether or not the values are equal to each other. In a case where the determination unit 212 determines that there is no data row, of which the value of the aggregation data matches with the value of the data, the process is moved to the process in step S911. On the other hand, in a case where the determination unit 212 determines that a data row, of which the value of the aggregation data matches with the value of the data, exists one or more, the process is moved to the process in step S909. The determination in step S908 is not limited to complete matching of the data values described above but based on similarity of data values, degree of correlation, or the like, for example, the data values may be regarded to match in a case where the data values are similar to the predetermined reference or correlation is high.

Explaining the extraction data 1200 illustrated in FIG. 12 and the aggregation data 1300 illustrated in FIG. 13 as an example for the process in step S908, since the aggregation data 1300 is a result of calculation of an average salary for each of departments as described above, a data row of the aggregation data used for comparison is the department 1301. The department 1301 includes three "first development department", "second development department", and "third development department" as data values.

In the process in step S907, data rows of the affiliation 1202 and the work place 1205 are specified as a data row of which the type number of the value matches with the output line number of the aggregation data. The data row of the affiliation 1202 includes three "first development department", "second development department", and "third development department" as data values. In addition, the data row of the work place 1205 includes three "Tokyo", "Aichi", and "Osaka" as data values. That is, the data values included in the affiliation 1202 are equal to the data values included in the department 1301, but the data values included in the work place 1205 are not equal to the data values included in the department 1301. Therefore, the determination unit 212 specifies the affiliation 1202 as a data row of which the values of the data are equal to the values of the aggregation data.

The process of step S909 will be described. In step S909, the determination unit 212 determines whether or not a data row specified in step S908 is sorted. Here, for example, a case where the data row is sorted means that when values of the data rows are sequentially referred to from an upper most line of the data lines (when referred to in a form of the sequential process), the same data values consecutively appears at a time. For example, in the data row of the affiliation 1202 of the extraction data 1200 illustrated in FIG. 12, in a case where pieces of data are sequentially referred to from an upper most line of the data rows in a downward direction as viewed in FIG. 12, firstly, "first development department" appears as a data value, "second development department" appears after then, and "third development department" appears. After "second development department" appears, "first development department" does not appear as a data value. In addition, after "third development department" appears, "second development department" does not appear as a data value. Therefore, a data row of the affiliation 1202 of the extraction data 1200 illustrated in FIG. 12 is said to be sorted.

In a case where it is determined that the data row specified in step S908 is not sorted, the process is moved to the process in step S911. On the other hand, in a case where it is determined that the data row specified in step S908 is sorted, the process is moved to the process in step S910.

In step S910, for the data row specified by the determination unit 212 in step S908, information specifying the extraction data in which the data row is included and a position of the data row in the extraction data is stored in the extraction data information storage unit 222.

FIG. 15 illustrates an example of information stored in the extraction data information storage unit 222. For example, as illustrated in FIG. 15, the extraction data information storage unit 222 stores a job net name 1501, a job name 1502, an extraction data name 1503, and the division reference row information 1504.

The job net name 1501 is information capable of identifying a job net to which each of jobs belongs, for example, may be the same data form as the job net name 1101 described above.

The job name 1502 is information capable of identifying each of jobs, for example, may be the same data form as the job name 1102 described above. A job name described in FIG. 15 is a job name of the extraction job.

The extraction data name 1503 is information capable of identifying input data of the extraction process of the extraction job.

The division reference row information 1504 is information, which is referred during division of the extraction data for parallel execution, specifying a data row of the extraction data, described below. For example, the extraction data information storage unit 222 stores values of the row number 1401 corresponding to a data row referred during division of the extraction data for parallel execution as values of the division reference row information 1504.

Returning to the description in FIG. 10. In step S911, the determination unit 212 stores information indicating that there is no corresponding data row in the division reference row information 1504 corresponding to the extraction data stored in the extraction data information storage unit 222.

For example, the determination unit 212 stores "−1" as a value of the division reference row information 1504 corresponding to the extraction data stored in the extraction data information storage unit 222. In the present example, a value of "−1" indicates that a data row which can be used during division of extraction data for parallel execution does not exist in the corresponding extraction data. That is, the aggregation job succeeding the extraction job for outputting the extraction data executed by the process in step S911 may not be executed in parallel. In the processes in step S910 and step S911, it can be distinguished whether or not parallel execution can be performed with respect to the extraction data with reference to the extraction data information storage unit 222.

An effect realized by the series of processes illustrated in FIG. described described above will be described. For example, as described using FIG. 3, in a case where the execution servers 3-1 to 3-*n* executes the aggregation job in parallel, an error can occur in a result of the aggregation process. For example, in order to reduce the error in the aggregation result, in FIG. 3, it is preferably to divide output data from the extraction job so that input data is divided for data by department. To do so, in a step of the extraction process executed by the extraction job, it is preferably to specify a classification type (for example, department in FIG. 3), which is a reference for executing the aggregation process, and a data row in the extraction data which can distinguish classification.

When specifying a data row, item names (data label names) of the data rows in the extraction data and the aggregation data may not the same. Also in the examples in FIGS. 12 and 13, an item name of the data row of the extraction data corresponding to "department" in the aggregation data is "affiliation", and the item names do not equal to each other. Therefore, when a data row in the extraction data which can distinguish classification by using an item name of the data row is specified, an error may occur in a specific result.

In order to reduce the error in the specific result, for example, it is considered that a data row in extraction data which can distinguish classification is specified base on a data value in the data row not an item name in the data row. However, in each of the drawings described above, the data is simplified for explanation, but in actual extraction data, the number of data rows and the number of records are often huge. For this reason, when verification of data values is executed with respect to all of data rows, a lot of process time is desired.

In the present example, narrowing down of data rows which can distinguish classification is executed with respect to each of the data rows in the extraction data based on a type number of data values. A data value is selectively verified with respect to a narrowed-down data row based on a type number of data values, and it is determined whether or not the data row is a data row which can distinguish classification. Therefore, it is possible to reduce data rows desiring verification of data values.

In addition, it is impossible to distinguish the classification type, which is a reference for executing the aggregation process, before the aggregation job is ended and data output from the aggregation job is ended. On the other hand, a process in which a type number of the data values is specified with respect to each of the data rows in the extraction data can be started in a step in which the extraction data (input data for extraction job) is specified. Then, timing at which the process, in which the type number of the data values is specified, can start is earlier than an end of the aggregation process.

Therefore, before the aggregation process is ended, the type number of the data values is specified with respect to each of the data rows in the extraction data and narrowing down of data rows which can distinguish classification can be executed with respect to each of the data rows based on the type number of the data values. That is, before the aggregation process is, ended and the data value can be verified, it is possible to execute a process desired to selecting candidates of the data rows which can distinguish classification. Accordingly, after the aggregation process is ended, it is possible to reduce a time desired for verifying the data values.

In the series of processes illustrated in FIGS. 9 and 10, contents and sequence of the processes can be appropriately changed within a range in which an object of the present example can be achieved. For example, as described in step S909, the determination process in which it is determined that data rows are sorted can be started in a step in which the extraction data is specified. Therefore, for example, it is also possible to adopt a form in which the process in step S909 is executed prior to the processes in steps S907 and S908.

The above is a description of the series of processes illustrated in FIGS. 9 and 10.

Detail of Step S901

Details of the processes of step S901 in FIG. 9 described above will be described. Although the processes of step S901 are executed during execution of the aggregation job, the processes includes a process during data input and a process during data output. In the following, the process during data input and the process during data output will be described in sequence.

Figure 16:
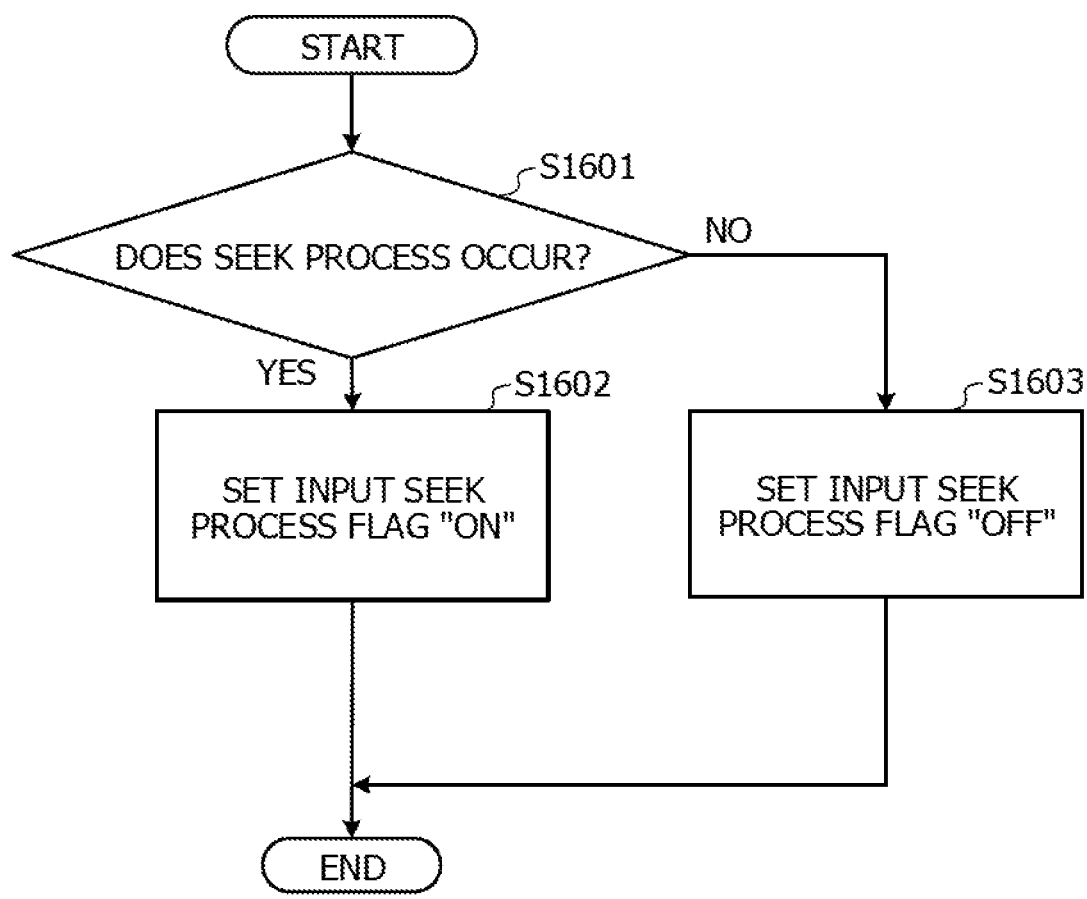
FIG. 16 illustrates a flowchart (during data input) of processes in step S901.

FIG. 16 illustrates a flowchart of the processes in step S901 during data input to the aggregation job. For example, a series of processes illustrated in FIG. 16 is started according to occurrence of data input to the aggregation job.

In step S1601, the determination unit 212 determines whether or not a seek process is called in data input to the aggregation job. Here, the seek process is a process in which a read position and a write position of data are designated discontinuously during data input and data output. A case where the seek process of a file does not occur means that data input to the aggregation job is performed by a sequential process. According to a determination result in step S1601, the determination unit 212 stores, information indicating the determination result in the seek process management information storage unit 223.

FIG. 17 illustrates an example of information stored in the seek process management information storage unit 223. The seek process management information storage unit 223 stores, for example, a job name 1701, an input seek process flag 1702, and an output seek process flag 1703 illustrated in FIG. 17.

The job name 1701 is information capable of identifying each of jobs, for example, may be the same data form as the job name 1102 described above. In FIG. 17, a job of which a job name stored in the seek process management information storage unit 223 is only the aggregation job.

The input seek process flag 1702 is information indicating whether or not a seek process occurs during data input to the aggregation job. In addition, the output seek process flag 1703 is information indicating whether or not a seek process occurs during data output from the aggregation job.

First, returning to the description in FIG. 16, in a case where it is determined that the seek process of a file is called in data input to the aggregation job (Yes in step S1601), the determination unit 212 stores "on" in the seek process management information storage unit 223 as a value of the input seek process flag 1702 corresponding to a job of a determination target (step S1602). In the present example, a case where the value of the input seek process flag 1702 is "on" means that a seek process of a file is called in data input to the aggregation job. On the other hand, in a case where it is determined that the seek process of the file is not called in data input to the aggregation job (No in step S1601), the determination unit 212 stores "off" in the seek process management information storage unit 223 as a value of the input seek process flag 1702 corresponding to a job of a determination target (step S1603). In the present example, a case where the value of the input seek process flag 1702 is "off" means that the seek process of the file is not called in data input to the aggregation job. However, a correspondence between a value and a meaning of a flag may be different from that of FIG. 17 as long as presence or absence of the seek process can be distinguished based on the data value.

Data input to the aggregation job is monitored and a result of monitoring is stored in the seek process management information storage unit 223 in the processes of step S1602 or S1603 and then the process illustrated in FIG. 16 is ended.

Figure 18:
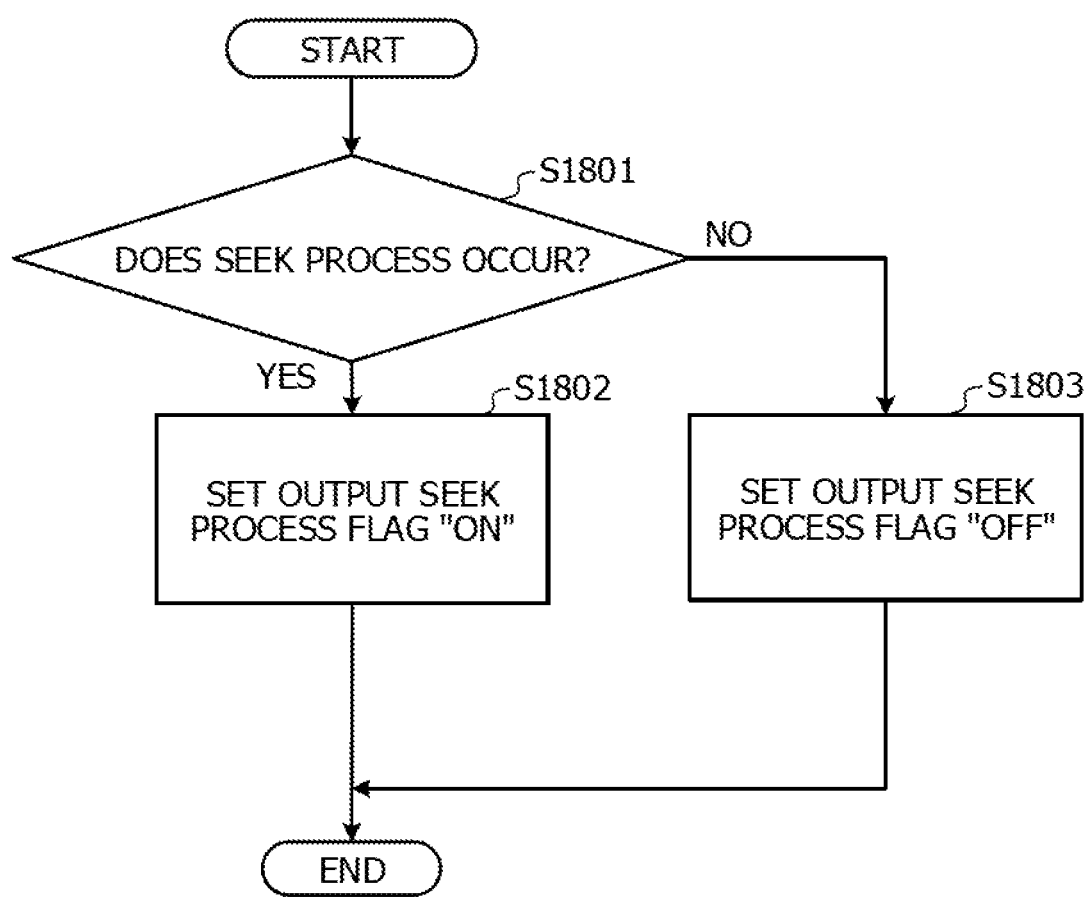
FIG. 18 illustrates a flowchart (during data output) of processes in step S901.

Next, FIG. 18 illustrates a flowchart of processes in step S901 during data output from the aggregation job. For example, a series of processes illustrated in FIG. 18 is started according to occurrence of data output from the aggregation job.

In step S1801, the determination unit 212 determines whether or not a seek process of a file is called in data output from the aggregation job. In a case where it is determined that the seek process of the file is called in data output from the aggregation job (Yes in step S1801), the determination unit 212 stores "on" in the seek process management information storage unit 223 as a value of the output seek process flag 1703 corresponding to a job of a determination target (step S1802). In the present example, a case where the value of the output seek process flag 1703 is "on" means that a seek process of a file is called in data output from the aggregation job. On the other hand, in a case where it is determined that the seek process of the file is not called in data output from the aggregation job (No in step S1801), the determination unit 212 stores "off" in the seek process management information storage unit 223 as a value of the output seek process flag 1703 corresponding to a job of a determination target (step S1803). In the present example, a case where the value of the output seek process flag 1703 is "off" means that the seek process of the file is not called in data output from the aggregation job. However, a correspondence between a value and a meaning of a flag may be different from that of FIG. 17 as long as presence or absence of the seek process can be distinguished based on the data value.

Data output from the aggregation job is monitored and a result of monitoring is stored in the seek process management information storage unit 223 in the processes of step S1802 or S1803, and then the process illustrated in FIG. 18 is ended.

By storing information illustrated in FIG. 17 in the seek process management information storage unit 223, it is possible for the determination unit 212 to refer to the seek process management information storage unit 223 and execute a determination process described in step S904 in FIG. 9 described above.

Process Flow of Actual Operation

Hereinbefore, the processes during the test operation performed prior to actual operation are described, but hereinafter, processes during the actual operation will be described.

Figure 19:
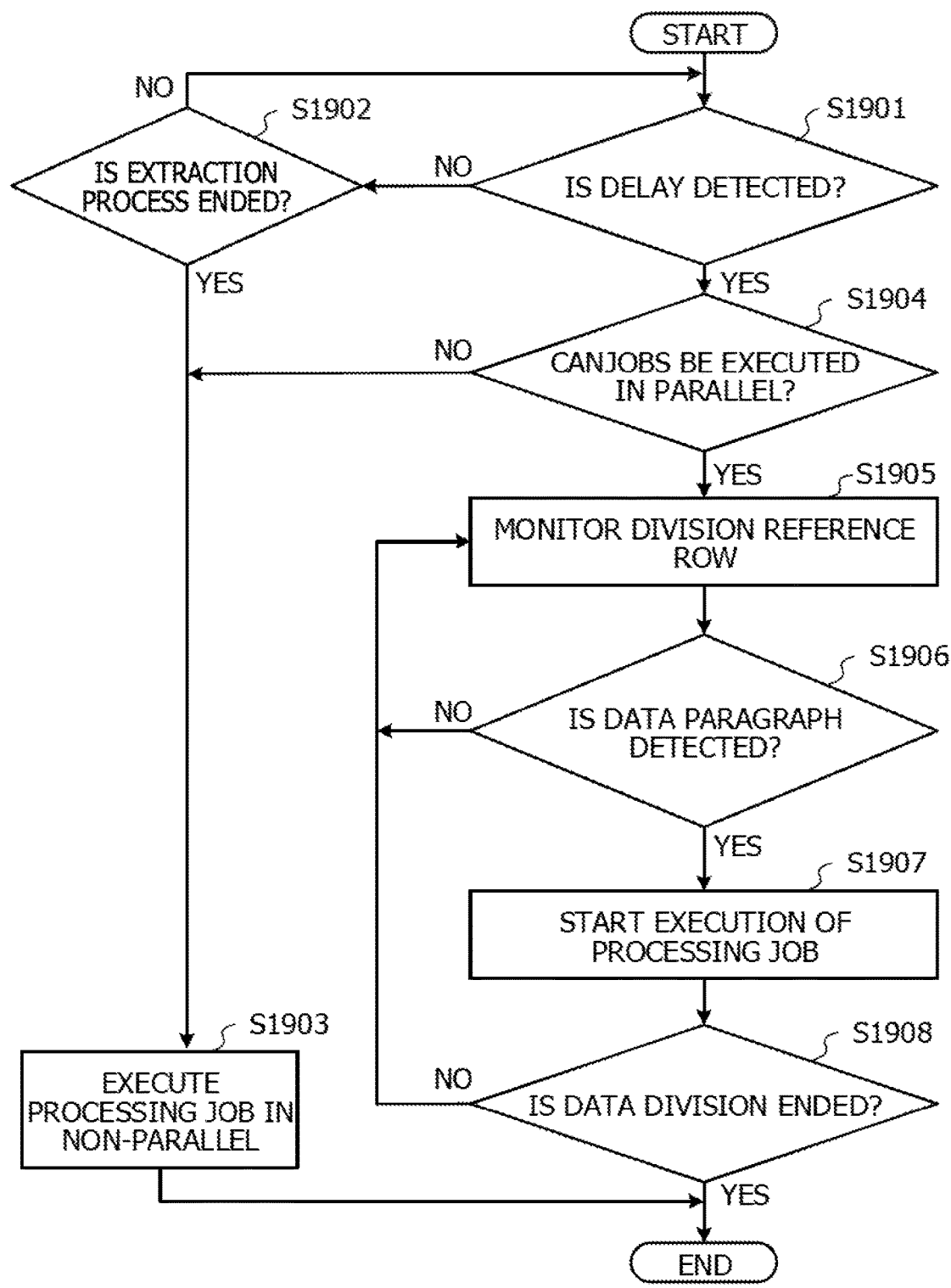
FIG. 19 illustrates a flowchart of processes executed by the management device during actual operation.

FIG. 19 illustrates a flowchart of processes executed by the management device 2 during the actual operation. A series of processes illustrated in FIG. 19 is started, for example, according to an execution request of jobs transmitted from the terminal device 1 during the test operation. Execution of each of the jobs is assigned to one of the execution servers 3-1 to 3-n under control of the execution control unit 211 of the management device 2.

In step S1901, the delay detection unit 213 determines whether or not a delay occurs in an execution schedule of jobs. For example, the delay detection unit 213 monitors a size of pieces of output data (outputted data) of the extraction job every predetermined time (for example, 1 minute) during execution of the extraction process. Then, in a case where it is determined that the processing job or the aggregation job may not be finished by predicting whether or not the processing job or the aggregation job succeeding the extraction job can be finished by a set end time based on the obtained output data size, the delay detection unit 213 may determine that a delay occurs.

Operation Information Storage Unit

FIG. 20 illustrates an example of information stored in the operation information storage unit 225. For example, as illustrated in FIG. 20, the operation information storage unit 225 stores a job name 2001, an output data size 2002, a processable data size 2003, an end time 2004, and a parallel execution flag 2005.

The job name 2001 is information capable of identifying each of jobs, for example, may be the same data form as the job name 1102 described above.

The output data size 2002 is information indicating a result of regularly monitoring a size of pieces of output data (outputted data) of the extraction job by the delay detection unit 213 during execution of the extraction process. A value of a data size stored as the output data size 2002 is sequentially updated according to execution of monitoring (step S1901) of the extraction job by the delay detection unit 213.

The processable data size 2003 is information indicating an input data size (=an output data size from the extraction job) which can be processed per unit time for the processing job and the aggregation job succeeding the extraction job. For example, the processable data size 2003 is information indicating an input data size which allows the processing process and the aggregation process per one minute. For example, the operation information storage unit 225 may separately store input data sizes which can be processed per unit time in the processing job and the aggregation job. An input data size which can be processed per unit time can be calculated by obtaining an output data size from the extraction job during the test operation and duration from a start of the processing job to an end of the aggregation job for output data. Specifically, for example, a result of dividing the output data size by the duration can be an input data size which can be processed per unit time. An input data size which can be processed per unit time is an input data size which can be processed per unit time in a case where jobs are not executed in parallel.

The end time 2004 is, for example, information indicating a deadline (time) of a process end set in advance for the aggregation job succeeding the extraction job. A process end time is, for example, an end time of each of jobs set for ending a series of jobs within a predetermined period of time in an execution plan of predetermined jobs. For example, the execution plan of jobs can be determined by executing a known scheduling function or the like implemented in the management device 2. A case where an actual end time exceeds the end time means an execution delay of the job.

The parallel execution flag 2005 is information indicating whether or not the processing job and the aggregation job succeeding the extraction job are jobs which can be executed in parallel. In the embodiment of FIG. 20, in a case where the processing job and the aggregation job succeeding the extraction job can be executed in parallel, a value of the parallel execution flag 2005 is "on". In a case where the processing job and the aggregation job succeeding the extraction job may not be executed in parallel, a value of the parallel execution flag 2005 is "off".

The process of step S1901 in FIG. 19 will be described again. For example, the delay detection unit 213 obtains a data size by multiplying a difference between a current time and a time shown in the end time 2004, that is, a remaining time until an end time by a data size shown in the processable data size 2003. The data size obtained by multiplication is said to be an estimated value of input data amount which can be processed by the processing job and the aggregation job succeeding the extraction job from a current time to an end time. After information of the output data size 2002 is updated in step S1901, the delay detection unit 213 compares the updated output data size with the data size obtained by multiplication described above. Then, in a case where the data size obtained by multiplication exceeds a data size shown in the output data size 2002, the delay detection unit 213 determines that a delay occurs in execution of jobs (Yes in S1901). In addition, in a case where the data size obtained by multiplication is equal to or less than the data size shown in the output data size 2002, the delay detection unit 213 determines that a delay does not occur in execution of jobs (No in S1901).

In a case where it is determined the delay does not occur in execution of jobs, the delay detection unit 213 determines whether or not the extraction process by the extraction job is continuing (step S1902). In a case where it is determined that the extraction process is continuing (Yes in S1902), the delay detection unit 213 executes the process of step S1901 again. That is, the delay detection unit 213 continues monitoring of the extraction job and a determination process of a delay. This is because there is a possibility that a delay occurs in execution of jobs when the extraction process proceeds, even if an execution delay of the jobs is not detected at a present time.

On the other hand, in a case where the extraction process is ended (No in S1902), the execution control unit 211 performs control so as to execute the processing job and the aggregation job succeeding the extraction job without parallel execution (S1903).

In step S1901, in a case where it is determined that a delay occurs in execution of jobs (Yes in S1901), the execution control unit 211 determines whether or not the processing job and the aggregation job succeeding the extraction job can be executed in parallel (step S1904). For example, the determination unit 212 can determine whether or not the processing job and the aggregation job succeeding the extraction job can be executed in parallel with reference to the parallel execution flag 2005. In a case where the processing job and the aggregation job succeeding the extraction job may not be executed in parallel (No in S1904), a process of step S1903 is executed. In a case where the processing job and the aggregation job succeeding the extraction job can be executed in parallel (Yes in S1904), a process of step S1905 is executed. In step S1901, the execution control unit 211 may determine whether the processing job and the aggregation job succeeding the extraction job can be executed in parallel with reference to the seek process management information storage unit 223 without being stored and referred as the parallel execution flag 2005.

In step S1905, the execution control unit 211 specifies a data row (division reference row) in the extraction data and monitors an output status of output data with respect to the specified division reference row with reference to the division reference row information 1504 stored in the extraction data information storage unit 222.

In step S1906, the execution control unit 211 detects a data paragraph by the division reference row. Here, a data paragraph is a position at which a data value changes and a position of a data line at which data division is performed in a case where the processing job and the aggregation job succeeding the extraction job are executed in parallel in output data. For example, explaining the extraction data 1200 illustrated in FIG. 12, there are two data paragraphs described above in FIG. 12. One is at a position at which a value of the affiliation 1202 changes from "first development department" to "second development department", that is, a position between a data line of "BB" and a data line of "CC" in values of the name 1201. The other is at a position at which a value of the affiliation 1202 changes from "second development department" to "third development department", that is, a position between a data line of "EE" and a data line of "FF" in values of the name 1201. For example, the execution control unit 211 detects a data paragraph when detecting a change of a data value in a data row of the division reference row described above with reference to data output from the extraction job. In a case where the data paragraph is not detected (No in S1906), the processes of step S1905 and step S1906 continue.

In a case where the data paragraph is detected (Yes in S1906), the execution control unit 211 regards output data outputted before by a position of the detected data paragraph as input data and assigns the processing job succeeding the extraction job to one of the execution servers 3-1 to 3-n (step S1907). Accordingly, in the execution server to which execution of the processing job is assigned, one of a plurality of processing jobs to be executed in parallel is executed.

After execution, of the process of step S1907, the execution control unit 211 determines whether or not division of output data from the extraction job is end (step S1908). For example, the number of times of detection of a data paragraph for output data from the extraction job by the execution control unit 211 is saved in a memory or the like. Then, the execution control unit 211 can determine whether or not division of output data is end depending on whether or not the number of times of detection of the data paragraph is reached "(type number of data for a division reference row of the extraction data)−1". Since the number of a data paragraph is one less than a type number of data, in a case where the number of times of detection of the data paragraph is reached "(type number of data for a division reference row of the extraction data)−1", the execution control unit 211 can determine that the data paragraph for output data under monitoring is not detected after that. In other words, after output data from the extraction job, data which is not input to the processing job at an end point is regarded as input data and the processing job succeeding the extraction job is assigned to one of the execution servers 3-1 to 3-n, so that execution of all of the plurality of processing jobs executed in parallel is started. A unit of a process resource assigned to each of the plurality of jobs executed in parallel may be, for example, an execution server unit as a hardware or a core unit of a processor included in the execution server.

On the other hand, in a case where the number of times of detection of the data paragraph is less than "(type number of data for a division reference row of the extraction data)−1" (No in S1908), the process of step S1905 is executed again.

The description of the series of processes illustrated in FIG. 19 is end, but execution of jobs by the execution servers 3-1 to 3-n after the jobs are assigned by the execution control unit 211 is performed will be described.

In step S1907, after the processing job is assigned, the processing job is executed in the execution servers 3-1 to 3-n to which the job is assigned. After the processing job is executed, an aggregation job with output data from the processing job as input data is executed. At this time, the succeeding aggregation job is executed in parallel in, the same manner as the processing job. In addition, an execution server to which execution of each of a plurality of aggregation jobs is assigned is the same as the execution server which executed the processing job of the preceding stage. Therefore, following the processing job, the aggregation job is also executed in parallel.

There are two major forms of data output for the plurality of the aggregation jobs executed in parallel.

One is a case where an output destination of output data from the aggregation job is DB. DB described here includes RDB realized by a relational database management system (RDBMS). In a case where an output destination is DB, data output from the aggregation job is an updating process of a record of DB. At this time, each of the plurality of the aggregation jobs executed in parallel can output data without waiting an end of the aggregation process of other job if the aggregation process of each of the plurality of the aggregation jobs is end. Then, an end of data output of all of the plurality of the aggregation jobs executed in parallel is regarded as an end of the aggregation job.

The other is a case where an output destination of output data from the aggregation job is a file. At this time, since a form of an output file is the same form as a case where parallel execution is not performed, even if parallel execution is performed, there is only one output file. Therefore, each of the plurality of the aggregation jobs executed in parallel waits until an end of the aggregation process of other job after the aggregation process of each of the plurality of the aggregation jobs is end. Then, after the aggregation processes of all of the plurality of the aggregation jobs executed in parallel are end, a file merged with an aggregation result is generated and the aggregation job is end. The process in which the file merged with the aggregation result is generated may be performed by one of the execution servers 3-1 to 3-n or may be executed by the execution control unit 211 of the management device 2.

According to the above processes, it is possible to execute the processing job and the aggregation job succeeding the extraction job in parallel and to reduce a process time. In a case case where execution of jobs is delayed, it is possible to solve an execution delay of the jobs by reducing the processing time. In the present example, when execution of jobs is not delayed, even if the processing job and the aggregation job can be executed in parallel, parallel execution is not performed. For this reason, the jobs are executed with less process resources than a case where parallel execution is performed. Accordingly, as long as an execution delay of jobs does not occur, process resources for job execution can be saved.

In addition, in the present example, the execution control unit 211 divides the extraction data into a plurality of pieces of the extraction data based on a data paragraph and the processing job is executed in parallel with each of the divided pieces of the extraction data as input data. Since the extraction data is divided into the plurality of pieces of the extraction data based on the data paragraph, as described in FIG. 3, it is possible to reduce an error of the aggregation data. In addition, according to detection of a data paragraph, by starting execution of non-executed data by the processing job before a detected data paragraph, a part of the processing job to be executed in parallel can started without waiting an end of all of the extraction job. Therefore, it is possible to end earlier each of the processing jobs executed in parallel.

Figure 21:
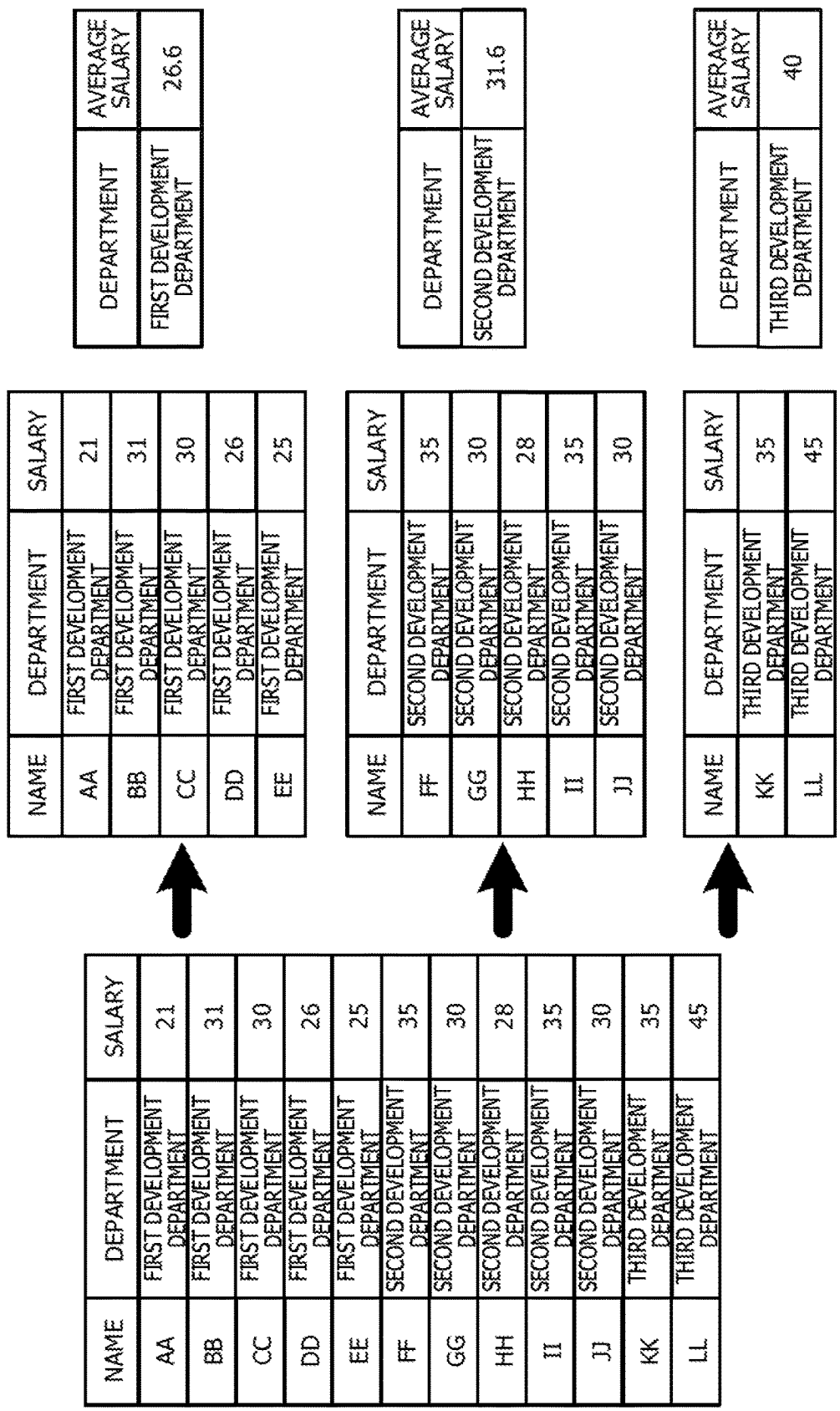
FIG. 21 illustrates an image diagram when a parallel process of jobs is executed based on the present example.

FIG. 21 illustrates an image diagram when a parallel process of jobs is executed to the extraction data described in FIG. 3 based on the present example. Although a point that the described extraction data and aggregation process are executed in parallel is the same as FIG. 3, records indicating the same department are aggregated into one execution server (process assignment unit) unlike FIG. 3. For this reason, as compared with FIG. 3, it is understood that an error of the aggregation data is solved.

Hardware Configuration

Figure 22:
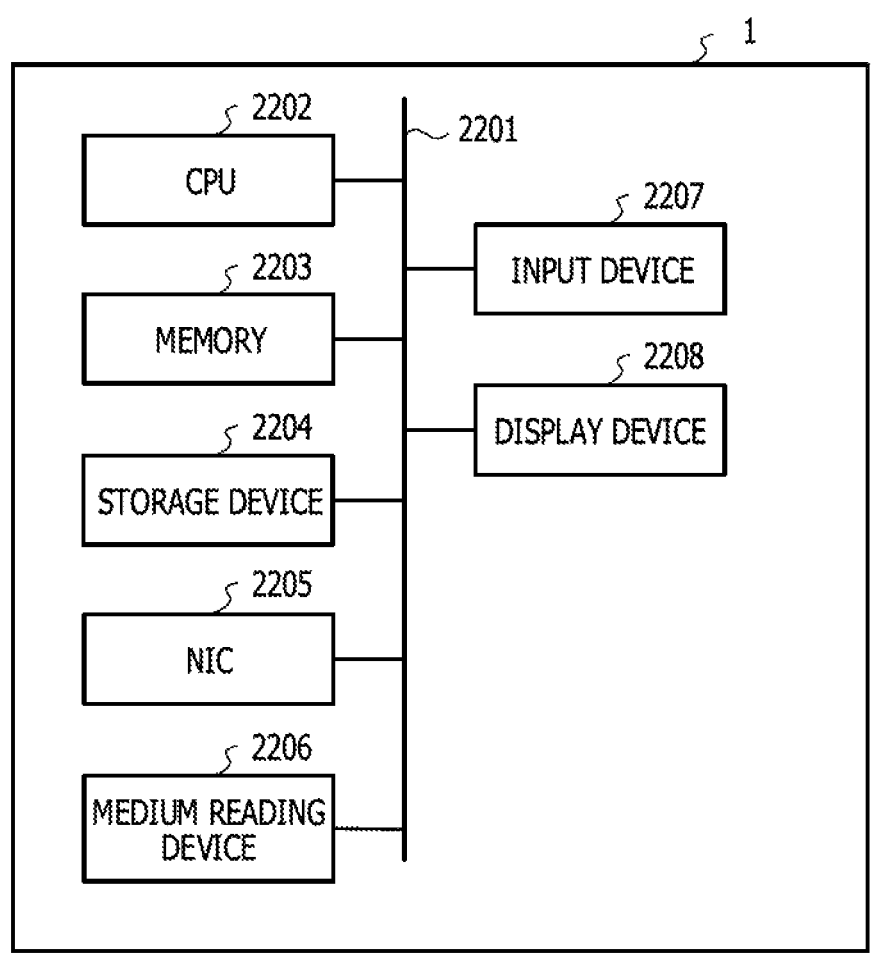
FIG. 22 is a diagram illustrating an example of a hardware configuration of a terminal device in the present example.

FIG. 22 is a diagram illustrating an example of a hardware configuration of the terminal device 1 in the present example. In FIG. 22, an example of the hardware configuration of the terminal device 1 is illustrated but the management device 2, the execution servers 3-1 to 3-n and the DB server 4 can adopt the same configuration as described below.

The terminal device 1 is an information process device including, for example, a CPU 2202, a memory 2203, a storage device 2204, an NIC 2205, a medium reading device 2206, an input device 2207, and a display device 2208 connected with each other via a bus 2201.

The CPU 2202 performs control of various operations in the terminal device 1. The memory 2203 and the storage device 2204 store a program performing various processes described in the present example or various types of data used for various processes. The storage device 2204 is a storage medium such as HDD, SSD, or the like.

The CPU 2202 may realize the control unit 210 described in FIG. 8 and each of function units included in the control unit 210 by executing a reading process and control of a program stored in the memory 2203 or the storage device 2204. In addition, each of the memory 2203 and the storage device 2204 can function as the storage unit 220 described FIG. 8.

The NIC 2205 is a hardware used for transmission and reception of data via a network by wire or by wireless. The NIC 2205 can function as the communication unit 203 under control of the CPU 2202.

The medium reading device 2206 is a device for reading data from a recording medium and is a disk drive for reading data stored in a desk medium such as CD-ROM or DVD-ROM, a card slot for reading data stored in a memory card, or the like. A part or all of data stored in the storage unit 220 described above may be stored in a recording medium which is readable using the medium reading device 2206.

The input device 2207 is a device which receives input or designation from a user of the terminal device 1. An example of the input device 2207 is a keyboard, a mouse, a touch pad, or the like. The display device 2208 performs display of various type of information under control of the CPU 2202. The display device 2208 is, for example, liquid crystal display. In a case where the terminal device 1 is, for example, a smartphone, a PDA, or a tablet PC, a touch panel including a function of the input device 2207 and a function of the display device 2208 may be used.

For the management device 2, the execution servers 3-1 to 3-n, and the DB server 4 according to the present example, a computer having the same hardware configuration as that in FIG. 22 can be used, and thus description thereof will be omitted. However, specific hardware (model, performance, or the like) of CPU, a memory, a storage device, NIC, a medium reading device, an input device, and an output device may be different from each other in the terminal device 1, the management device 2, the execution servers 3-1 to 3-n, and the DB server 4. For example, a CPU having a higher calculation capability and a memory with a larger capacity than the terminal device 1 may be mounted in the execution servers 3-1 to 3-n. In addition, in order to secure a storage area, a storage device with a larger capacity than the terminal device 1 or the execution servers 3-1 to 3-n may be mounted in the DB server 4 or the DB server 4 may be connected to a storage system which can store data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a data specification program which causes a computer to execute a process, the process comprising:
obtaining a calculation result that includes a first data column indicating a result of a calculation process executed by using a plurality of values included in a specified data column among a plurality of data columns in first data records stored in a first database, the calculation result further including a second data column in association with the first data column;
identifying a number of different values in the second data column included in the calculation result;
identifying a number of different values in each of a plurality of data columns including a plurality of data values in second data records stored in a second database;
determining a corresponding data column from the plurality of data columns in the second data records as corresponding to the second data column of the calculation result when the number of different values in the corresponding data column of the second data records is equal to the number of different values in the second data column of the calculation result;
detecting one or more changing positions in the corresponding data column, the second data records being sorted in accordance with the plurality of values included in the corresponding data column, the one or more changing positions being a position at which a data value changes in the corresponding data column of the sorted second data records;

dividing the second data records into a plurality of groups in_accordance with the one or more changing positions; and running different computing resources in parallel, with each of the different computing resources respectively using each group of the plurality of groups into which the second data records are divided in accordance with the one or more changing positions, to execute another calculation process for each group of the plurality of groups.

2. The non-transitory computer-readable storage medium according to claim 1, wherein the second database is the first database, and the second data records are the first data records.

3. The non-transitory computer-readable storage medium according to claim 1, wherein the first data records are data records used for a test operation of a job execution executed by using the second data records.

4. The non-transitory computer-readable storage medium according to claim 1, wherein the calculation result is obtained by performing a test operation of the calculation process.

5. The non-transitory computer-readable storage medium according to claim 1, wherein the identifying the number of different values in each of the plurality of data columns is executed before a result of the another calculation process is generated.

6. The non-transitory computer-readable storage medium according to claim 3, wherein the detecting, the dividing, and the executing are executed when a determination is made that an end of the another calculation process is going to be delayed with respect to a predetermined time limit.

7. The non-transitory computer-readable storage medium according to claim 4, wherein an extraction process and processing for the second data records are executed before the another calculation process for the plurality of groups is executed, and wherein the process further comprises, during the extraction process, determining whether an end of the another calculation process is going to be delayed with respect to the predetermined time limit based on a size of the second data records extracted by the extracting process, a size of data which can be processed per unit time in the processing for the second data records and the another calculation process, and a remaining time until the predetermined time limit.

8. The non-transitory computer-readable storage medium according to claim 5, wherein the process comprises executing the dividing and the executing when a determination is made that an end of the another calculation process is going to be delayed.

9. A data processing method executed by a computer, the data processing method comprising:

obtaining a calculation result that includes a first data column indicating a result of a calculation process executed by using a plurality of values included in a specified data column among a plurality of data columns in first data records stored in a first database, the calculation result further including a second data column in association with the first data column;

identifying a number of different values in the second data column included in the calculation result;

identifying a number of different values in each of a plurality of data columns in second data records stored in a second database;

determining a corresponding data column from the plurality of data columns in the second data records as corresponding to the second data column when the number of different values in the corresponding data column of the second data records is equal to the number of different values in the second data column of the calculation result;

detecting one or more changing positions in the corresponding data column, the second data records being sorted in accordance with the plurality of values included in the corresponding data column, the one or more changing positions being a position at which a data value changes in the corresponding data column of the sorted second data records;

dividing the second data records into a plurality of groups in accordance with the one or more changing positions; and running different computing resources in parallel, with each of the different computing resources respectively using each group of the plurality of groups into which the second data records are divided in accordance with the one or more changing positions, to execute another calculation process for each group of the plurality of groups.

10. A data processing device comprising:

a memory; and a processor coupled to the memory and the processor configured to execute a process, the process including:

obtaining a calculation result that includes a first data column indicating a result of a calculation process executed by using a plurality of values included in a specified data column among a plurality of data columns in a first data records stored in first database, the calculation result further including a second data column in association with the first data column;

identifying a number of different values in the second data column included in the calculation result;

identifying a number of different values in each of a plurality of data columns in second data records stored in a second database;

determining a corresponding data column from the plurality of data columns in the second data records as corresponding to the second data column when the number of different values in the corresponding data column of the second data records is equal to the number of different values in the second data column of the calculation result;

detecting one or more changing positions in the corresponding data column, the second data records being sorted in accordance with the plurality of values included in the corresponding data column, the one or more changing positions being a position at which a data value changes in the corresponding data column of the sorted second data records;

dividing the second data records into a plurality of groups in accordance with the one or more changing positions; and running different computing resources in parallel, with each of the different computing resources respectively using each group of the plurality of groups into which the second data records are divided in accordance with the one or more changing positions, to execute another calculation process for each group of the plurality of groups.

* * * * *